C. De QUILLFELDT,
Assignor to K. Hutter.
BOTTLE-STOPPER.
No. 7,722. Reissued June 5, 1877.
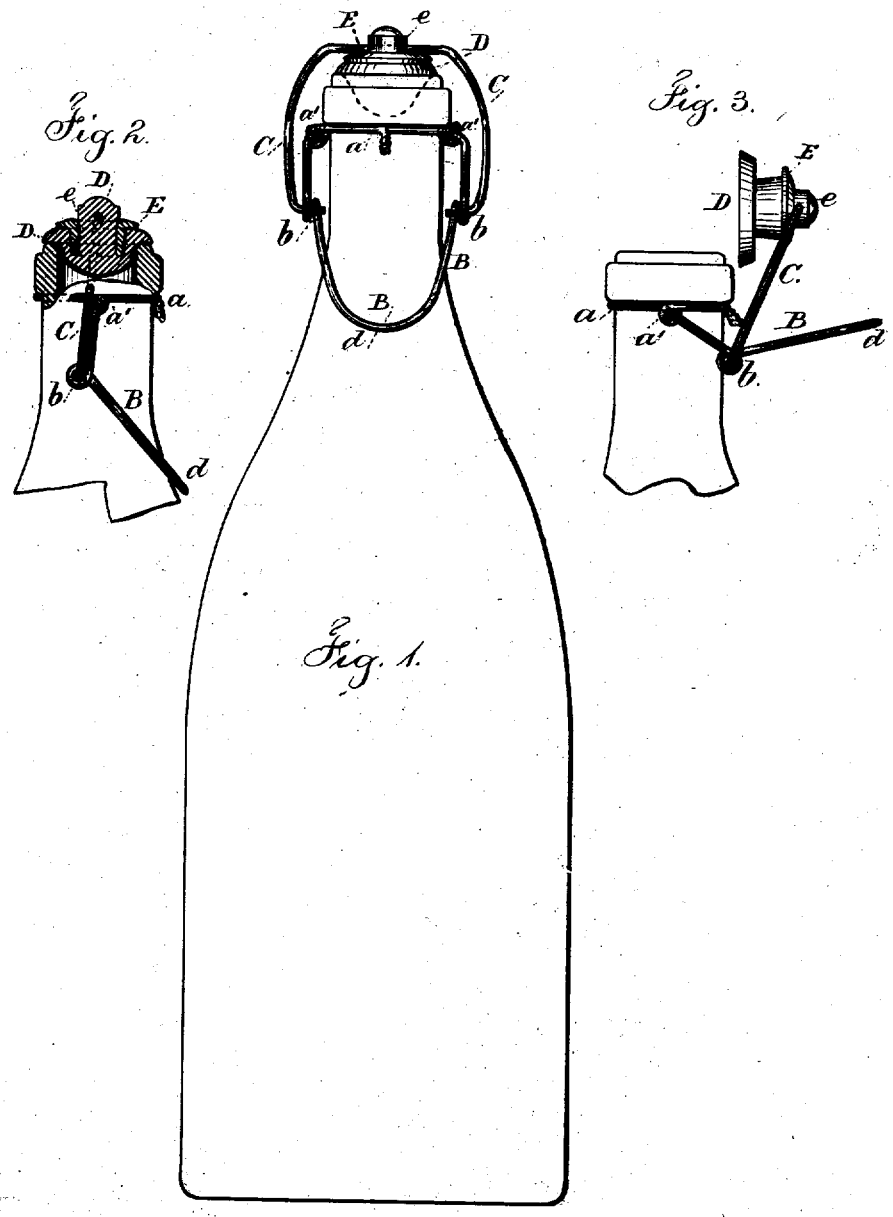
Witnesses
Chas H Smith
Harold Ferrell
Inventor
Charles de Quillfeldt.
for Lemuel W. Serrell
Atty

UNITED STATES PATENT OFFICE.

CHARLES DE QUILLFELDT, OF NEW YORK, N. Y., ASSIGNOR TO KARL HUTTER, OF SAME PLACE.

IMPROVEMENT IN BOTTLE-STOPPERS.

Specification forming part of Letters Patent No. 158,406, dated January 5, 1875; reissue No. 7,722, dated June 5, 1877; application filed April 24, 1877.

*To all whom it may concern:*

Be it known that I, CHARLES DE QUILLFELDT, of the city, county, and State of New York, have made an invention of certain new and useful Improvements in Bottle-Stoppers; and that the following is a full, clear, and exact description of the same.

The object of this invention is to permit bottle-mouths to be readily and securely closed and readily opened without disconnecting the stopping devices from the bottle. To this end my invention consists of a certain new elastic stopple, and of certain new combination of devices, of which the following are the principles, viz., a compound stopper, composed of a rigid annular member adapted to withstand the strains incident to closing the bottle, and an elastic disk intervening between the said rigid member and the bottle-mouth, so as to prevent the contact of the rigid member with the glass of the bottle, and to close the bottle-mouth tightly, the disk having an upwardly-projecting stem which extends through the rigid member; an elastic and flexible disk stopper of small thickness compared with its diameter, and provided with a stem, said stem serving to connect said elastic disk stopper to a yoke or frame, by which the same is attached to the bottle; a yoke or bail adapted to straddle the bottle-mouth and constitute one of the devices, by means of which the elastic stopper is connected with, or linked to, the bottle, so that said stopper remains connected with the bottle although the bottle-mouth is open; a lever, which is connected with said yoke or bail, and by means of which the elastic stopper can be forced downward and compressed to close the bottle-mouth tightly.

The lever constitutes one of the devices by means of which the compound stopper is connected with the bottle whether the bottle-mouth be closed or open, and the pivots and eyes of the lever constitute parts of two pivotal connections whereby it may be connected with the compound stopper and with the bottle-mouth so as to turn or swing for the purpose of utilizing its lever property.

The several combinations of the above-mentioned devices which constitute the invention are set forth in the claims at the close of this specification.

In order that they may be fully understood, I have represented in the accompanying drawing, and will proceed to describe, the mode in which I embodied them for practical use at the time of filing the application for my original patent.

Figure 1 represents a front view of the bottle-stopping devices in the positions severally occupied by them when the bottle is closed. Fig. 2 is a vertical transverse section of parts of the same. Fig. 3 is a side view of the devices, showing the compound stopper disengaged from the bottle-mouth, but still connected with the bottle.

The compound stopper represented in the said drawing is composed of the rigid cap-piece E and the elastic member D, which is made of rubber or other elastic material.

The elastic member D has the form of a disk, of small thickness compared with its diameter, so that it is flexible, and may readily bend to conform to the form which may be given to the cap-piece. It is also constructed with a central shank or stem, *e*, which is perforated transversely near its upper end, so that a wire may be passed through it to prevent its withdrawal from the cap-piece E, which is perforated centrally to permit the stem of the rubber disk to be passed through it. The lower surface of the disk D is of larger diameter than the opening in the mouth of the bottle to which said disk is to be applied.

The compound stopper composed of the rigid cap-piece and elastic member is connected with the bottle by means of a lever, B, and yoke C, which are connected with each other, with the bottle, and with the compound stopper by pivotal connections, so as to permit the lever, yoke, and stopper to be turned relatively to the bottle and to each other, for the purpose of forcing the compound stopper downward to close the mouth of the bottle with the force incidental to the power of the lever; but also to maintain the connection between the compound stopper and the bottle when the latter is opened, in which case the compound stopper is still linked to the bottle through the lever and yoke.

The pivotal connection between the yoke C and the lever B is formed by the bent ends of the yoke entering eyes *b b* of the lever B.

The pivotal connection by means of which the connected lever and yoke are held to the bottle is formed by the bent ends of the lever entering as pivots into the eyes *a' a'* of a band, *a*, which is secured to the exterior of the bottle-neck, and the pivotal connection by which the connected yoke and lever are held to the compound stopper is formed by the central part of the yoke, which passes through and turns as a pivot in the transverse perforation of the stem *e*.

The yoke C is constructed to straddle the bottle-mouth, and the lever B is constructed of yoke form to straddle the bottle-neck, one set of the pivotal connections being at its ends, while another is intermediate between its ends and its handle end *d*.

The intermediate pivotal connection is at a sufficient distance from the end pivotal connection, and from the handle end of the lever, and so placed that when the lever has been turned against the bottle to the position to hold the compound stopper so that it closes the bottle-mouth, the intermediate pivotal connection is at that time turned past the vertical plane, passing through the pivotal connections with the bottle and with the compound stopper, and the compound stopper is thereby locked in its closed position, as represented at Fig. 2.

The closing of the bottle-mouth is performed by guiding the stopper by hand to the bottle-mouth, with the elastic member beneath the cap-piece, and by turning the lever downward and inward, or toward the bottle to its locked position.

The opening of the bottle is performed by turning the lever outward or away from the bottle, so as to raise and liberate the compound stopper, which may then be farther moved by hand.

I claim as my invention—

1. The combination, substantially as before set forth, of the compound stopper, the yoke, the lever, and the supporting device on the bottle, by means of three pivotal connections, upon which the said members can be turned relatively to each other without disconnecting either one from the other.

2. The combination, substantially as before set forth, of the compound stopper, the lever, and the yoke, by means of two pivotal connections, upon which the said three members can be turned relatively to each other without disconnection, and the pivotal connection of the lever to the bottle, substantially as set forth.

3. In combination with a bottle, the flexible elastic stopper-disk, whose lower surface is larger than the opening in the mouth of the bottle, and which is provided with an upwardly-projecting stem or shank, substantially as before set forth.

4. The combination of a perforated rigid cap-piece, with the flexible elastic stopper-disk, whose lower surface is larger than the opening in the mouth of the bottle, and which is constructed with a stem of reduced diameter, said stem being passed into the perforation of the cap-piece, substantially as before set forth.

5. The combination of the perforated rigid cap-piece and the flexible elastic stopper-disk, constructed with a laterally-perforated stem, through which a wire is passed above said cap-piece to confine said cap-piece to said disk, substantially as specified.

6. The combination, substantially as before set forth, of the flexible elastic stopper-disk, constructed with a perforated stem, the perforated cap-piece, and the yoke, which is passed transversely through the said stem for the purpose of preventing the withdrawal thereof from the cap-piece.

7. The combination, substantially as before set forth, of the yoke and the lever, which are directly connected one with the other by a pivotal connection, the lever being constructed with end pivots to enable it to be connected pivotally with the supporting device on the bottle.

8. The eccentric lever B, made with two pivotal connections, the one joining it to the bottle, the other to the pivoted stopple, so that by vibrating said lever on its connection with the bottle it will carry the stopple toward or away from said bottle, substantially as specified.

9. The combination of the pivoted bottle-stopper with the yoke C, neck-ring *a*, and eccentric lever B, the said yoke and eccentric lever being pivoted together and arranged so that the stopper is forced into the bottle by swinging the handle part of the lever against the side of the bottle, substantially as herein shown and described.

Signed by me this 29th day of November, A. D. 1876.

C. DE QUILLFELDT.

Witnesses:

GEO. D. WALKER,

GEO. T. PINCKNEY.